Patented Nov. 4, 1952

2,616,791

UNITED STATES PATENT OFFICE 2,616,791

PROCESS FOR PREPARING SELENIUM DIOXIDE

Reuben Roseman, Baltimore, Ralph W. Neptune, Dundalk, and Benjamin W. Allan, Baltimore, Md., assignors to The Glidden Company, Cleveland, Ohio, a corporation of Ohio No Drawing. Application September 30, 1950, Serial No. 187,842

10 Claims. (Cl. 23—139)

This invention relates to novel processes for preparing aqueous solutions of selenious acid and for preparing selenium dioxide.

The compound selenium dioxide, $SeO_2$, has a variety of uses, among which may be mentioned the following: it is widely used as an oxidizing agent in the field of organic chemistry as, for instance, in the preparation of sex hormone derivatives related to pregnenolone and androsterone; it has interesting catalytic properties serving, for example, in the medium of concentrated sulfuric acid as a catalyst for the rapid combustion of organic matter in the Kjeldahl method of analysis; likewise, in concentrated sulfuric acid solution, it gives characteristic color reactions and organic selenium compounds with alkaloids and aromatic amines; it is used in the manufacture of other selenium compounds such as the selenites; and it is employed in toning processes in photography.

Heretofore the best methods for the preparation of selenium dioxide have involved oxidation of selenium by nitric acid or combustion of selenium in the presence of nitrogen dioxide. We have discovered what we believe to be a new process for making selenium dioxide which is, at the same time, simple, direct, and free of any fume nuisance.

Contrary to all available prior published work on the reaction between selenium and hydrogen peroxide, which teaches only oxidation of the element by the peroxide to selenic acid, that is, the hexavalent state (see, for example, the authoritative Mellor's "A Comprehensive Treatise on Inorganic and Theoretical Chemistry," Longmans, Green & Co., 1922, 1930, vol. I, pp. 937 and 941, and vol X, p. 747; and Friend's "A Textbook of Inorganic Chemistry," Griffin and Co., 1931, vol. VII, part II, p. 300), we have found that under the appropriate conditions oxidation to the quadrivalent stage exclusively is readily secured, apparently according to the reaction, (1)     $Se + 2H_2O_2 = SeO_2 + 2H_2O$ We have discovered that if a concentrated hydrogen peroxide solution is slowly added to a concentrated water slurry of powdered elementary selenium, with vigorous stirring and with cooling of the mixture, and in such amount as not to exceed that stoichiometrically demanded by reaction (1), above, then simple dehydration of the filtrate obtained from the thoroughly reacted reaction mixture will yield crystals of selenium dioxide (the anhydride of selenious acid) entirely free of selenic acid or selenium trioxide.

The following are examples of our process, although these examples are not to be construed in a limiting sense.

Example 1

200 g. of gray selenium powder (better than 99% pure) were slurried in 100 cc. of water contained in a 2-liter beaker. To this slurry were added 387 cc. of 30% hydrogen peroxide solution (General Chemical Company), equivalent to 75% of the amount theoretically demanded by reaction (1), above. The hydrogen peroxide was added over a period of four hours, with provisions made throughout for cooling up 25°–35° C. and for thorough stirring of the reaction mixture. The mixture was further stirred for about an hour and was then allowed to stand overnight to insure complete reaction of the hydrogen peroxide, following which it was filtered. The residue on the funnel was washed, then dried at 105° C. to yield 59 g. of selenium, suitable for reuse in a fresh reaction with hydrogen peroxide; the filtrate and washings were evaporated to approximate dryness on the hot plate, and the resulting crystals were heated for several hours at approximately 150°–160° C. to decompose any remaining selenious acid, ground in a mortar, and finally dried at 105°–110° C. (to remove any moisture picked up in the course of grinding), to yield 197 g. of selenium dioxide. This product analyzed 70.5% Se (theoretical Se content in $SeO_2$ is 71.2%); it was found to be entirely free of hexavalent selenium as shown by tests on a portion with barium chloride in the presence of nitric acid; it contained less than 0.15% total metallic impurities as shown by spectrographic analysis; and it exhibited an X-ray powder diffraction pattern identical in all respects with that of known selenium dioxide.

Example 2

In this experiment a slurry of 200 g. of selenium in 100 cc. of water, contained in a 1500-cc. beaker, was treated with 516 cc. of 30% hydrogen peroxide solution; the hydrogen peroxide, representing the chemical equivalent of the selenium, was added over a period of 2¾ hours, with good agitation of the reaction mixture and cooling to 25°–35° C. Stirring was continued for an additional four-hour period and the mixture was allowed to stand overnight to insure complete reaction of the hydrogen peroxide. The steps of filtration, washing, and dehydration were conducted as in the previous example. The residual selenium weighed 26 g. and was re-usable, and the yield of selenium dioxide crystals was 245 g. The latter product analyzed 70.5% Se, was entirely free of hexavalent selenium, and, as in the case of the product of Example 1, was well suited for use in the various types of chemical reactions calling for selenium dioxide.

In general, in the practice of our invention it is best (a) To employ such an amount of hydrogen peroxide as is not in excess of that equivalent to the selenium in the reaction, $$Se + 2H_2O_2 = SeO_2 + 2H_2O$$

(b) To conduct the reaction in the cold, and (c) To provide for the absence of any residual hydrogen peroxide in the reaction mixture just prior to the filtration and dehydration steps. Such absence may be secured by continued stirring of the reaction mixture for a suitable period after the last addition of hydrogen peroxide.

Inattention to the above conditions will lead to end products which are contaminated with hexavalent selenium, as the following experiment will show.

A 50-g. sample of gray selenium powder, such as was used in the preceding examples, was slurried in 25 cc. of water, and the slurry was treated with 194 cc. of 30% $H_2O_2$. The peroxide, representing a 50% excess according to reaction (1) above, was added rapidly (in less than 10 minutes), with stirring, and no attempt was made to cool the reaction mixture. The mix was further heated on the hot plate for about an hour, at the end of which time it was observed that all of the selenium was in solution. The filtered solution, unlike those of Examples 1 and 2, could not be dried by evaporation on the hot plate followed by heating overnight at a temperature of 150°–160° C.; the end product of this experiment, unlike the excellent, dry crystalline preparations obtained in the preceding examples, was a pasty mass which contained the equivalent of more than 27% $SeO_3$.

It will be understood that hydrogen peroxide of any convenient concentration may be employed, but that concentrated solutions are preferred since they introduce less water and consequently reduce the amount of water which must ultimately be evaporated to bring about recovery of crystalline selenium dioxide. For the same reason we prefer to use concentrated slurries of comminuted selenium. Enough water should be present, however, to permit adequate control of the temperature of the reaction mixture by stirring and cooling.

*Example 3*

A slurry of selenium—100 g. in 50 cc. of water—was added to 258 cc. of 30% $H_2O_2$, over a period of 2 hours, with vigorous agitation of the reaction mixture and cooling to below 35° C. Beyond this point the procedure was the same as that of Examples 1 and 2. The residual selenium weighed 16.4 g., and the yield of selenium dioxide crystals was 117 g. The latter material analyzed 70.5% Se and it was entirely free of hexavalent selenium.

Having now disclosed our invention, what we claim is:

1. The process for converting selenium selectively to selenium dioxide which comprises the steps of: providing an aqueous slurry of comminuted selenium; gradually adding aqueous hydrogen peroxide to said slurry while stirring the reaction mass and while continuously maintaining the temperature of the reaction mass below about 35° C., until the total effective quantity of added hydrogen peroxide amounts to no more than 2 moles thereof per mole of selenium in said slurry; thereafter discontinuing the addition of hydrogen peroxide and continuing to stir the reaction mass and to maintain its temperature below about 35° C. until all of the hydrogen peroxide in said mass has been reduced; then removing any undissolved selenium from the reaction mass and recovering an aqueous solution of selenium dioxide in the form of selenious acid.

2. The process as claimed in claim 1 which includes the further step of evaporating the recovered solution approximately to dryness and then decomposing any remaining selenious acid in the resulting residue into selenium dioxide and water vapor by heating the residue at temperatures sufficiently high to effect such decomposition but below about 160° C.

3. The process as claimed in claim 1 wherein the temperature of the reaction mass is continuously maintained between about 25° C. and 35° C.

4. The process as claimed in claim 3 which includes the further step of evaporating the recovered solution approximately to dryness and then decomposing any remaining selenious acid in the resulting residue into selenium dioxide and water vapor by heating the residue at temperatures sufficiently high to effect such decomposition but below about 160° C.

5. The process of preparing selenium dioxide which comprises the steps of treating an aqueous slurry of selenium, while stirring, with aqueous hydrogen peroxide at temperatures below about 35° C. until at least a part of the selenium has been dissolved, the hydrogen peroxide employed in said treatment corresponding to not more than 2 moles thereof per mole of selenium being treated; continuing stirring of the reaction mixture for a sufficient period to insure complete reduction of the hydrogen peroxide; thereafter separating any undissolved selenium from the reaction mixture; and dehydrating the resulting solution at temperatures not in excess of about 160° C.

6. The process of preparing selenium dioxide from selenium, which comprises: slurrying about 200 parts of selenium in about 100 parts of water; while maintaining the reaction mixture in a liquid state but below a temperature of about 35° C., and while constantly stirring, slowly adding about 30% aqueous hydrogen peroxide to said slurry until the total effective quantity of hydrogen peroxide so added is not more than 2 moles per mole of selenium; continuing stirring of the reaction mixture for a sufficient period to insure complete reduction of the hydrogen peroxide; thereafter filtering off any undissolved selenium; evaporating the resulting filtrate to approximate dryness; and heating the residue at temperatures not in excess of about 160° C. to complete its dehydration to selenium dioxide.

7. The process of converting selenium selectively to selenium dioxide, which comprises the steps of: reacting comminuted selenium with not more than two moles of hydrogen peroxide per mole of selenium in the presence of water and with agitation at temperatures below about 35° C. until all of the hydrogen peroxide has been reduced; thereafter separating any undissolved selenium from the reaction mass and recovering an aqueous solution of selenium dioxide in the form of selenious acid.

8. The process as claimed in claim 7 which includes the further step of evaporating the recovered solution approximately to dryness and then decomposing any remaining selenious acid in the resulting residue into selenium dioxide and water vapor by heating the residue at temperatures sufficiently high to effect such decomposition but below about 160° C.

9. The process as claimed in claim 7 wherein the comminuted selenium is introduced slowly into aqueous hydrogen peroxide.

10. The process as claimed in claim 9 which includes the further step of evaporating the recovered solution approximately to dryness and then decomposing any remaining selenious acid in the resulting residue into selenium dioxide and water vapor by heating the residue at temperatures sufficiently high to effect such decomposition but below about 160° C.

REUBEN ROSEMAN.
RALPH W. NEPTUNE.
BENJAMIN W. ALLAN.

REFERENCES CITED

The following references are of record in the file of this patent:

Mellor, "A Comprehensive Treatise on Inorganic and Theoretical Chemistry," Longmans, Green & Co., N. Y., vol. X (1930), pages 808–810, 816, 817, 843–845.